(12) United States Patent
Shimizu

(10) Patent No.: US 8,218,063 B2
(45) Date of Patent: Jul. 10, 2012

(54) IMAGE CAPTURING APPARATUS, IMAGE CAPTURING METHOD, AND IMAGE CAPTURING PROGRAM

(75) Inventor: Seiya Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 12/805,947

(22) Filed: Aug. 25, 2010

(65) Prior Publication Data

US 2010/0328481 A1 Dec. 30, 2010

Related U.S. Application Data

(63) Continuation of application No. PCT/JP2008/054039, filed on Mar. 6, 2008.

(51) Int. Cl.
 H04N 5/232 (2006.01)
 H04N 7/18 (2006.01)
(52) U.S. Cl. ...................... 348/348; 348/135
(58) Field of Classification Search .................. 348/348, 348/345, 77, 135
See application file for complete search history.

(56) References Cited

U.S. PATENT DOCUMENTS

| 8,106,954 | B2 * | 1/2012 | Sato et al. ................. 348/234 |
| 2004/0227822 | A1 * | 11/2004 | Cartlidge et al. .......... 348/207.99 |
| 2005/0280709 | A1 * | 12/2005 | Katayama .................... 348/187 |
| 2006/0204132 | A1 * | 9/2006 | Fukuda et al. .............. 382/282 |
| 2007/0139541 | A1 * | 6/2007 | Fein et al. ................. 348/294 |
| 2008/0186390 | A1 * | 8/2008 | Sato et al. ................. 348/222.1 |
| 2010/0177184 | A1 * | 7/2010 | Berryhill et al. ........... 348/77 |

FOREIGN PATENT DOCUMENTS

| JP | 2004-21388 | 1/2004 |
| JP | 2004-328657 | 11/2004 |
| JP | 2008-16918 | 1/2008 |
| WO | 02/13141 | 2/2002 |

OTHER PUBLICATIONS

International Search Report for PCT/JP2008/054039, mailed May 13, 2008.
Iwahori, Y. et al., *Shape Reconstruction of Object from an Image under a Point Light Source Illumination*, The Transactions of the IEICE, vol. E 72, No. 7, Jul. 1989, pp. 852-862.
Zhang, R. et al., *Shape from Shading: A Survey*, IEEE Transactions on Pattern Analysis and Machine Intelligence, vol. 21, No. 8, Aug. 1999, pp. 690-706.
Extended European Search Report, mailed Apr. 5, 2012, in corresponding European Application No. 08721459.9 (6 pages).

* cited by examiner

*Primary Examiner* — Sinh Tran
*Assistant Examiner* — Selam Gebriel
(74) *Attorney, Agent, or Firm* — Staas & Halsey LLP

(57) ABSTRACT

An image capturing apparatus previously captures a calibration image that serves as a reference when a distance to an object is calculated, and calculates, when an image of the object is captured using a monocular camera, the distance from the lens of the camera to the object using the calibration image and the distance from the lens of the camera to the calibration image. In this case, the image capturing apparatus measures the distance from the lens of the camera to one or more arbitrary points on the object, calculates the diffuse reflection coefficient of the object using the measured distance, the luminance on each of one or more arbitrary points, the distance to the calibration image, and the luminance, and calculates the distance to the object from the lens of the camera to the object using the calculated diffuse reflection coefficient.

5 Claims, 9 Drawing Sheets

IMAGE CAPTURING APPARATUS, IMAGE CAPTURING METHOD, AND IMAGE CAPTURING PROGRAM

CROSS-REFERENCE TO RELATED APPLICATION

This application is a continuation of International Application No. PCT/JP2008/054039, filed on Mar. 6, 2008, the entire contents of which are incorporated herein by reference.

FIELD

The embodiments discussed herein are directed to an image capturing apparatus and an image capturing method.

BACKGROUND

Conventionally, there are various techniques in which an image of an arbitrary object is captured using a monocular camera, the distance to the object is measured, and a distance image of the object is generated. Technologies using such a distance image include, for example, a user interface that detects that the driving posture is abnormal, using a distance image of a driver who is driving a vehicle, and thus makes an alert and a user interface that detects the curvature of fingers in order to understand sign language and then operates.

As technologies for measuring the distance to an object, an image input device according to Japanese Laid-open Patent Publication No. 2004-328657 measures the distance on the basis of the intensity of reflection light that is reflected from an object by using a monocular camera and an illuminating unit that faces the object. Specifically, the image input device according to Japanese Laid-open Patent Publication No. 2004-328657 captures a first image while irradiating an object with light. The image input device then captures a second image without irradiating the object with light. On the basis of the difference in the reflection light intensity (distance difference) between the first image and the second image, the image input device then outputs a third image that is an image representing the intensity distribution of the reflection light, which is applied to the object, and that contains information on the depth of the object (distance information).

However, the above-described conventional technologies have a problem in that the distance to an object cannot be measured accurately.

Specifically, a diffuse reflection coefficient is usually necessary to measure the distance to an image. However, Japanese Laid-open Patent Publication No. 2004-328657 does not disclose a method for calculating a diffuse reflection coefficient of an object, which means that the diffuse reflection coefficient of the object has to be known. In other words, Japanese Laid-open Patent Publication No. 2004-328657 cannot be applied to an object for which the diffuse reflection coefficient is unknown and accordingly the distance to an object that has a shape difference in shape cannot be accurately measured.

SUMMARY

According to an aspect of an embodiment of the invention, an image capturing apparatus includes a distance measuring unit that measures a distance from a lens of a monocular camera for capturing an image of an object to one or more arbitrary points on the object; a diffuse reflection coefficient calculating unit that calculates a diffuse reflection coefficient of the object using the distance from the lens of the camera to a calibration image, a luminance of the calibration image, the distance to one or more arbitrary points on the object, which is measured by the distance measuring unit, and a luminance that is obtained by applying diffuse light to each of the one or more arbitrary points and that represents an intensity of brightness, which is estimated from a pixel value corresponding to a reflection light intensity representing an intensity of light reflected from the object, the calibration image being previously captured and serving as a reference when a distance to the object is calculated; and a distance calculating unit that calculates a distance from the lens of the camera to the object based on the distance from the lens of the camera to the calibration image, the luminance of the calibration image, the diffuse reflection coefficient of the object, which is calculated by the diffuse reflection coefficient calculating unit, and the luminance of the object.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. An overview and characteristics of the image capturing apparatus according to a first embodiment and the configuration and processes of the image capturing apparatus are explained in the order they appear in this sentence. The effects of the embodiment will be explained last.

[a] First Embodiment

Overview and Characteristics of Image Capturing Apparatus

Figure 1:
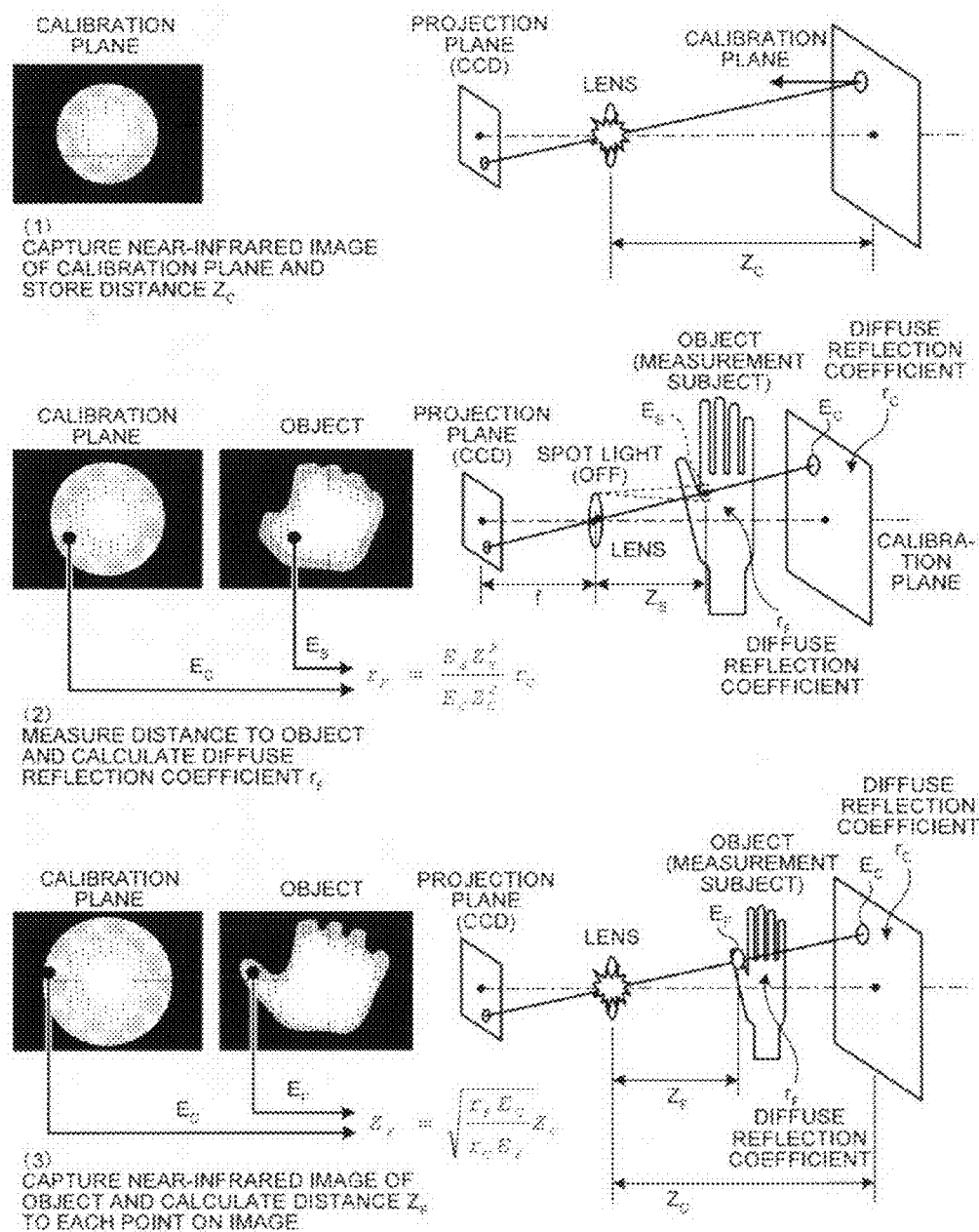
FIG. 1 is a diagram illustrating an overview and characteristics of an image capturing apparatus according to a first embodiment.

An overview and characteristics of an image capturing apparatus according to a first embodiment will be explained below. FIG. 1 is a diagram illustrating an overview and characteristics of the image capturing apparatus according to the first embodiment.

The image capturing apparatus is an apparatus that captures images of an object using a spot light source that emits visible light and a near-infrared light source that emits invisible light. The image capturing apparatus previously captures a calibration image that serves as a reference when the image of an object is captured using a monocular camera, calculates the distance from the lens of the camera to the object of which the image is captured, generates a distance image of the object that is obtained by converting the distance to an image, and represents the distance image to the user.

In the following explanation, the distance from the lens of the camera to the calibration plane is "$Z_C$", the diffuse reflection coefficient on the calibration plane is "$r_C$", and the luminance that represents the intensity of brightness that can be estimated from the pixel value at an arbitrary point on the calibration plane is "$E_C$". The distance from the lens of the camera to an arbitrary point on the object is "$Z_S$", the diffuse refection coefficient of the object is "$r_F$", and the luminance that represents the intensity of brightness that is estimated from the pixel value at an arbitrary point on the object is "$E_S$". The distance from the lens of the camera to each point that is an arbitrary point on the object and is different from the point corresponding to the distance "$Z_S$" is "$Z_F$", and the luminance that represents the intensity of brightness that is estimated from the pixel value of each point corresponding to the distance "$Z_F$" is "$E_F$".

Looking at an overview of such a configuration, it can be seen that that a calibration image that serves as a reference when the distance to an object is calculated is previously captured, and that, when an image of the object is captured using a monocular camera, the distance from the lens of the camera to the object is calculated using the calibration image and the distance from the lens of the camera to the calibration image. Particularly, the main characteristics of such a configuration are that, even if an image of an object for which the diffuse reflection coefficient is unknown is captured, an accurate distance can still be measured when a distance image of the object is generated.

The main characteristics of the configuration will be described here. The image capturing apparatus previously captures a calibration image that serves as a reference when the distance to an object is captured. The image capturing apparatus stores, in a predetermined storage unit, the luminance that is obtained from the captured calibration image and that represents the intensity of brightness, which is estimated from the pixel value corresponding to the reflection light intensity representing the intensity of light, and also stores the distance from the lens of the camera to the calibration image (see (1) in FIG. 1).

A specific example will be given below. The image capturing apparatus previously captures, using the near-infrared light source, a calibration image (calibration plane) that is a calibration image that serves as a reference when the distance to an arbitrary object is calculated. The distance from the lens of the camera to the calibration plane of which an image is captured is determined as a predetermined distance "$Z_C$" (for example, 10 cm) and an image of the calibration plane is captured with the calibration plane being set orthogonally to the optical axis of the camera.

The image capturing apparatus stores, in the predetermined storage unit, the luminance "$E_C$" that is obtained from the calibration plane of which an image is previously captured and that represents the intensity of brightness, which is estimated from the pixel value corresponding to the reflection light intensity representing the intensity of reflected light, and also stores the distance "$Z_C$" from the lens of the camera to the calibration plane. The diffuse reflection coefficient "$r_C$" on the calibration plane of which an image is captured may be known or unknown.

The image capturing apparatus measures the distance from the lens of the camera to one or more arbitrary points on the object and measures the diffuse reflection coefficient of the object using the distance from the lens of the camera to the calibration image; the luminance of the calibration image; the measured distance to one or more arbitrary points on the object; and the luminance that is obtained by applying diffuse light to each of one or more arbitrary points and that represents the intensity of brightness representing the intensity of brightness, which is estimated from the pixel value corresponding to the reflection light intensity representing the intensity of light reflected from the object (see (2) in FIG. 1).

The above-described example will be explained specifically here. The image capturing apparatus measures the distance "$Z_S$" to one or more arbitrary points on the object by trigonometry and using the spot light source. The image capturing apparatus then acquires, using the near-infrared light source, the reflection light intensity that represents the intensity of light that is reflected from the object with respect to one or more arbitrary points on the object on which measurement is performed using the spot light source.

The image capturing apparatus then calculates the diffuse reflection coefficient "$r_F$" using the luminance "$E_S$" that represents the intensity of brightness, which is estimated using the pixel value corresponding to the acquired reflection light intensity, the measured distance "$Z_S$", the distance "$Z_C$" from the lens of the camera to the calibration plane, which is stored in the predetermined storage unit, and the luminance "$E_C$" of the calibrate plane, which is stored in the predetermined storage unit. If the diffuse reflection coefficient "$r_C$" is unknown, the diffuse reflection coefficient "$r_F$" of the object can be calculated as "$r_F/r_C$".

The image capturing apparatus calculates the distance from the lens of the camera to the object using the distance from the lens of the camera to the calibration image, the luminance of the calibration image, the calculated diffuse reflection coefficient of the object, and the luminance of the object (see (1) in FIG. 1).

The above-described example will be explained specifically here. The image capturing apparatus captures a near-infrared image of the object using the near-infrared light source. The image capturing apparatus calculates the distance "$Z_F$" from the lens of the camera to each point on the captured near-infrared image, which covers the object, using the luminance "$E_F$" that is obtained from the captured near-infrared image and that represents the intensity of brightness, which is estimated using the pixel value corresponding to the reflection light intensity; the calculated diffuse reflection coefficient "$r_F$" or "$r_F/r_C$" of the object; the luminance "$E_C$" of the calibration plane; and the distance "$Z_C$" from the lens of the camera to the calibrate plane. The image that is captured as illustrated in (2) in FIG. 1 may be used as the near-infrared image that covers the object with each point about which a distance is calculated or an image without a shape difference (homogeneous object) may be used, i.e., an image of any measurement subject that has a uniform diffuse reflection coefficient may be used.

The image capturing apparatus then generates a distance image, which is obtained by converting the calculated distance to each point on the calculated near-infrared image to an image, and displays the distance image on a predetermined display unit. The above-described example will be specifically explained here. The image capturing apparatus generates a distance image, which is obtained by converting the calculated distance to each point on the near-infrared image to an image. The image capturing apparatus displays the generated distance image on the predetermined display unit. The type of displayed distance image includes a color lookup table that is color-coded in accordance with the distance value data or an image obtained by three-dimensionally plotting the distance value data.

When measuring the distance from the lens of the camera to a homogeneous object, the image capturing apparatus measures the distance to one or more points on the object image and, using one or more points on the image of the object, about which measurement is performed, the image capturing apparatus can calculate the distance to each point (all points) on the object. Accordingly, even for a case in which an image of an object of which the diffuse reflection coefficient is unknown is captured, the distance can be measured accurately.

Configuration of Image Capturing Apparatus

Figure 2:
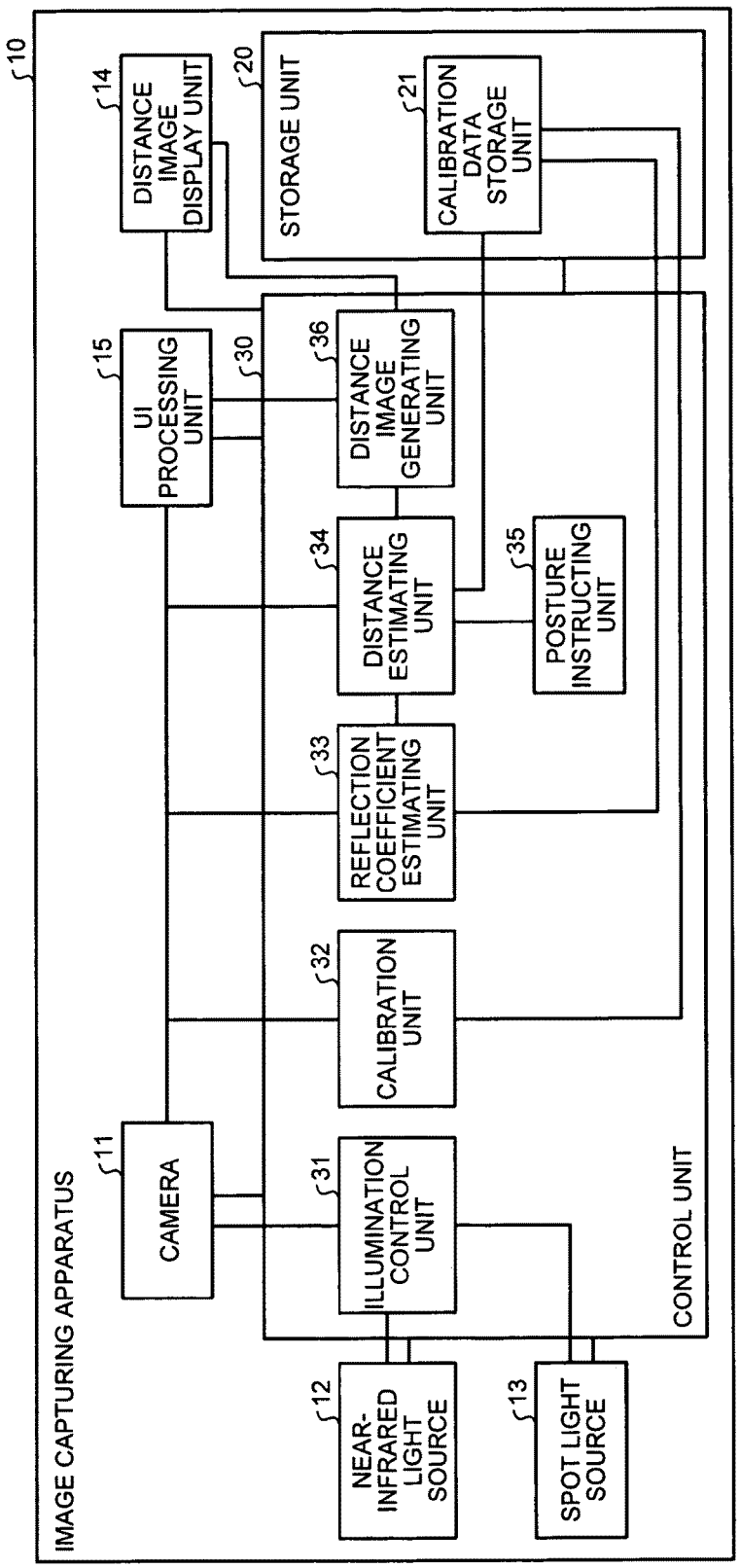
FIG. 2 is a block diagram of a configuration of the image capturing apparatus according to the first embodiment.

A configuration of the image capturing apparatus according to the first embodiment will be explained below with reference to FIG. 2. FIG. 2 is a block diagram of the image capturing apparatus according to the first embodiment. As illustrated in FIG. 2, an image capturing apparatus 10 includes a camera 11, a near-infrared light source 12, a spot light source 13, a distance image display unit 14, a user interface (UI) processing unit 15, a storage unit 20, and a control unit 30. The image capturing apparatus 10 calculates the distance to an object for which an image is captured, generates a distance image of the object that is obtained by converting the calculated distance to an image, and represents the distance image to the user.

The camera 11 includes an imaging device that can capture an image of near-infrared light and an optical system (the near-infrared light source 12 and the spot light source 13 that will be described below) and is provided with a lens that is used for capturing an image of an arbitrary object.

The near-infrared light source 12 includes light emitting devices that emit near-infrared light, such as near-infrared LEDs, and emits light to an object of which an image is captured by the camera 11. The spot light source 13 includes light emitting devices that emit near-infrared light, such as near-infrared LEDs, and emits spot light when an image of the object is captured using the camera 11 or when the distance to the object is measured.

The distance image display unit 14 displays the distance image that is generated by a distance image generating unit 36, which will be described below. After the processes of the control unit 30 have been performed, the UI processing unit 15 outputs a signal to an external interface, which is connected to the image capturing apparatus 10, on the basis of the image of the object and the distance image that are captured using the near-infrared light source 12 and the camera 11.

The storage unit 20 stores data necessary for various processes that are performed by the control unit 30 and the results of the various processes performed by the control unit 30. The storage unit 20 includes a calibration data storage unit 21 as a unit that is particularly closely related to the present invention.

The calibration data storage unit 21 stores information on the calibration image, such as the luminance that is obtained from the calibration image, which is captured by a calibration unit 32 to be described below, and that represents the intensity of brightness, which is estimated from the pixel value corresponding to the reflection light intensity representing the intensity of light.

The control unit 30 includes an internal memory for storing control programs, programs that are prepared for various process procedures, and predetermined data. The control unit 30 includes, as units particularly closely related to the present invention, an illumination control unit 31, the calibration unit 32, a reflection coefficient estimating unit 33, a distance estimating unit 34, a posture instructing unit 35, and the distance image generating unit 36. The control unit 30 performs various processes using these units.

The illumination control unit 31 controls the light sources, for example, switches on or off the near-infrared light source 12 and the spot light source 13 or switches off the near-infrared light source 12 and the spot light source 13 in accordance with the state of the image capturing apparatus 10. For example, the illumination control unit 31 switches on the near-infrared light source 12 when the image capturing apparatus 10 captures a near-infrared image and switches on the spot light source 13 when the image capturing apparatus 10 measures the distance to an arbitrary object.

The calibration unit 32 previously captures a calibration image, which serves as a reference when the distance to an object is measured, and stores, in the calibration data storage unit 21, the distance from the lens of the camera to the calibration image and the luminance that is obtained from the captured calibration image and that represents the intensity of brightness, which is estimated from the pixel value corresponding to the reflection light intensity representing the intensity of light.

A specific example will be provided here. The calibration unit 32 previously captures, using the near-infrared light source 12, a calibration image (calibration plane) that is a calibration image that serves as a reference when the distance to an arbitrary object is calculated. The distance from the lens of the camera to the calibration plane of which an image is captured is determined as the predetermined distance "$Z_C$" (10 cm) and an image of the calibration plane is captured with the calibration plane being set orthogonally to the optical axis of the camera.

The calibration unit 32 stores, in the calibration data storage unit 21, the distance "$Z_C$" from the lens of the camera to the calibration plane and the luminance "$E_C$" that is obtained from the calibration plane, of which an image is previously captured and that represents the intensity of light, which is estimated from the pixel value corresponding to the reflection light intensity representing the intensity of reflected light. The diffuse reflection coefficient "$r_C$" of the calibration plane of which an image is captured may be known one or unknown one.

The reflection coefficient estimating unit 33 measures the distance from the lens of the camera to one or more arbitrary points on the object and then calculates the diffuse reflection coefficient of the object using the distance from the lens of the camera to the calibration image; the luminance of the calibration image; the measured distance to one or more arbitrary points on the object; and the luminance that is obtained by illuminating one or more arbitrary points with diffuse light and that represents the intensity of brightness, which is estimated from the pixel value corresponding to the reflection light intensity representing the intensity of light reflected from the object.

Figure 3:
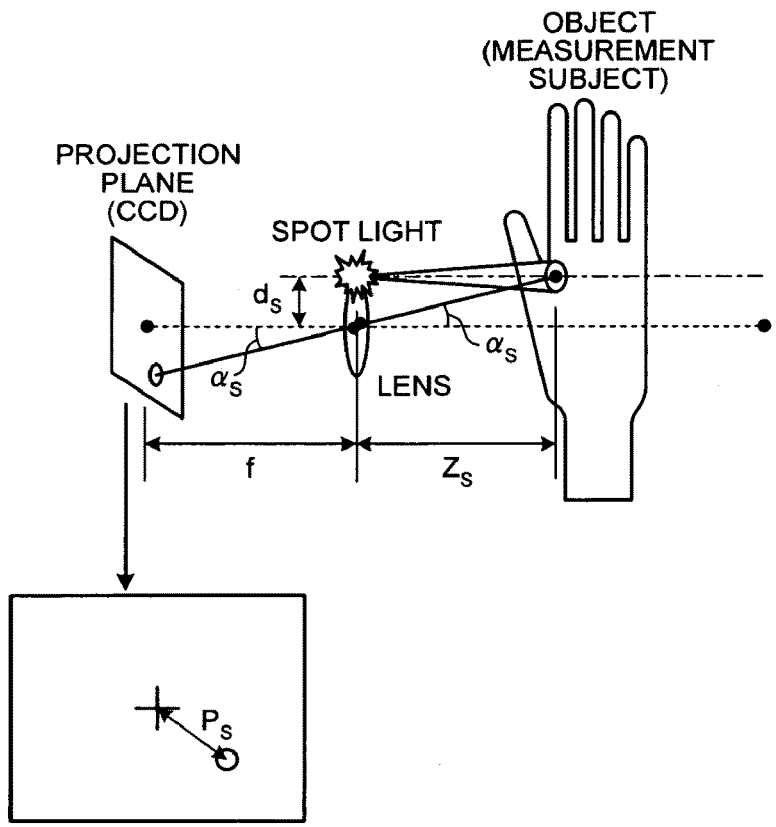
FIG. 3 is a diagram illustrating the principle of measuring a distance using a spot light source according to the first embodiment.

A specific example of the above-described example will be given below. As illustrated in FIG. 3, the reflection coefficient estimating unit 33 measures by trigonometry the distance "$Z_S$" to one or more arbitrary points on the object (measurement subject) using the spot light source 13. When measuring distance by trigonometry, the distance "$Z_S$" from the lens of the camera to one or more points on the object is calculated with Equation 1, using two similar triangles between the object plane (CCD) and the lens and between the lens and the object. FIG. 3 is a diagram illustrating the principle of measuring a distance using the spot light source 13 according to the first embodiment.

$$Z_S = \frac{d_S}{\tan\alpha_S};$$ (1)

$$\tan\alpha_s = \frac{P_s}{f}$$

Then:

$$Z_S = \frac{d_S}{P_S} f$$

Figure 4:
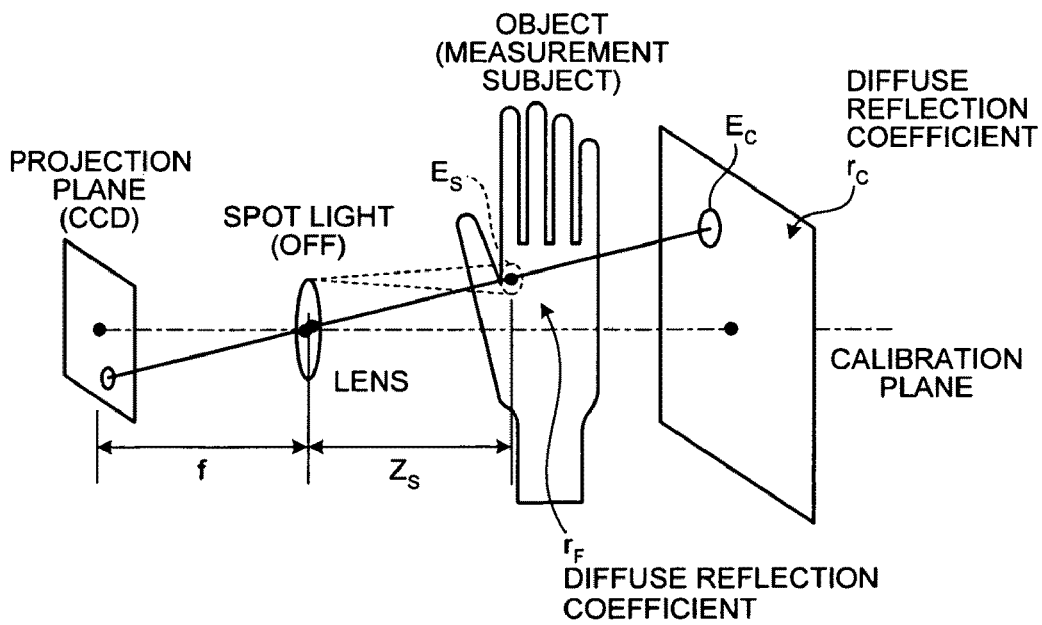
FIG. 4 is a diagram explaining the calculation of a diffuse reflection coefficient for an object according to the first embodiment.

As illustrated in FIG. 4, using the near-infrared light source 12, the reflection coefficient estimating unit 33 acquires the reflection light intensity that represents the intensity of light that is reflected from the object with respect to one or more arbitrary points on the object on which measurement is performed using the spot light source 13. Subsequently, the reflection coefficient estimating unit 33 calculates the diffuse reflection coefficient "$r_F$" from Equation 2 by using the luminance "$E_S$" that represents the intensity of brightness, which is estimated from the pixel value corresponding to the acquired reflection light intensity; the measured distance "$Z_S$"; the distance "$Z_C$" from the lens of the camera to the calibration plane, which is stored in the calibration data storage unit 21; and the luminance "$E_C$" of the calibration plane, which is stored in the calibration data storage unit 21. FIG. 4 is a diagram explaining the calculation of the diffuse reflection coefficient of an object according to the first embodiment.

$$r_F = \frac{E_S Z_S^2}{E_C Z_C^2} r_C$$ (2)

For the distance "$Z_S$" to one or more arbitrary points on the object, a range finder that measures the distance to an object using the principle of trigonometric measurement and the time of flight (TOF) that represents the time from when light is incident on an object to when the light reflects back may be used. In this case, it is necessary to known which distance of which point is being measured.

The distance estimating unit 34 calculates the distance from the lens of the camera to the object using the distance from the lens of the camera to the calibration image, the luminance of the calibration image, the calculated diffuse reflection coefficient of the object, and the luminance of the object.

Figure 5:
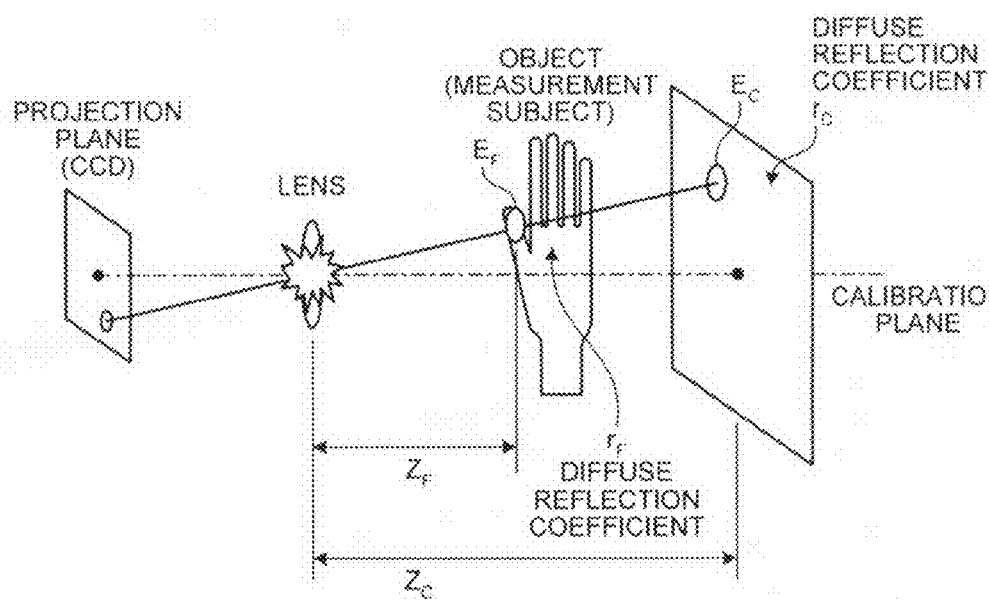
FIG. 5 is a diagram explaining the calculation of the distance to an object according to the first embodiment.

A specific example of the above-described example will be provided here. As illustrated in FIG. 5, the distance estimating unit 34 captures a near-infrared image of the object using the near-infrared light source 12. The distance estimating unit 34 calculates the distance "$Z_F$" from the lens of the camera to each point on the captured near-infrared image that covers the object from Equation 3 using the luminance "$E_F$" that is obtained from the captured near-infrared image and that represents the intensity of brightness, which is estimated from the pixel value corresponding to the reflection light intensity; the diffuse reflection coefficient "$r_F$" that is calculated by the reflection coefficient estimating unit 33; the luminance "$E_C$" of the calibration plane; and the distance "$Z_C$" from the lens of the camera to the calibration plane. The near-infrared image that covers the object from which each distance to each point is calculated may be of any homogeneous object, i.e., any object that is a measurement subject for which the diffuse reflection coefficient "$r_F$" is uniform. FIG. 5 is a diagram illustrating the calculation of the distance to the object according to the first embodiment.

$$Z_F = \sqrt{\frac{r_F E_C}{r_C E_F}} Z_C$$ (3)

The posture instructing unit 35 converts the value of the distance to the object, which is calculated by the distance estimating unit 34, to an image. If there is a portion the distance to which is extremely different, the posture instruction unit 35 outputs, according to variations in distance in the distance image of the object, an alert.

A specific example of the above-described example will be provided here. The posture instructing unit 35 calculates the flatness of the object from the data on the distance to the object, which is calculated by the distance estimating unit 34. The flatness of the object is calculated from, for example, an equation of "the value of the distance to the least distant point/the value of the distance to around the center portion$\leq 1$ (flat)". When the calculated flatness is less than or equal to a predetermined threshold, the posture instructing unit 35 recognizes that there is a portion the distance to which is extremely different from other portions on the object (i.e., the object is not properly set) and makes an alert. The posture instructing unit 35 that makes an alert may indicate which portion of the object is not properly set using, for example, sounds or graphics.

Figure 6:
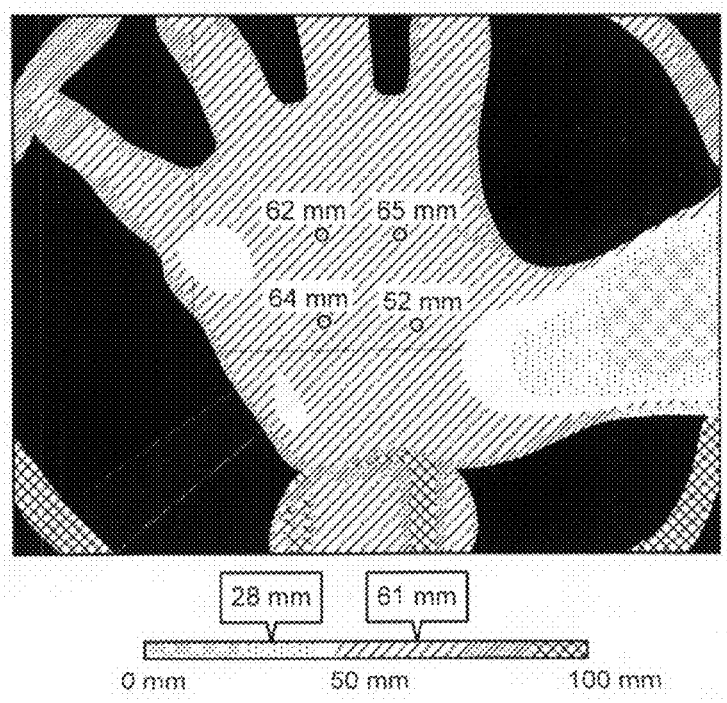
FIG. 6 is a diagram illustrating an example of a color lookup table that is color-coded according to distance data.
Figure 7:
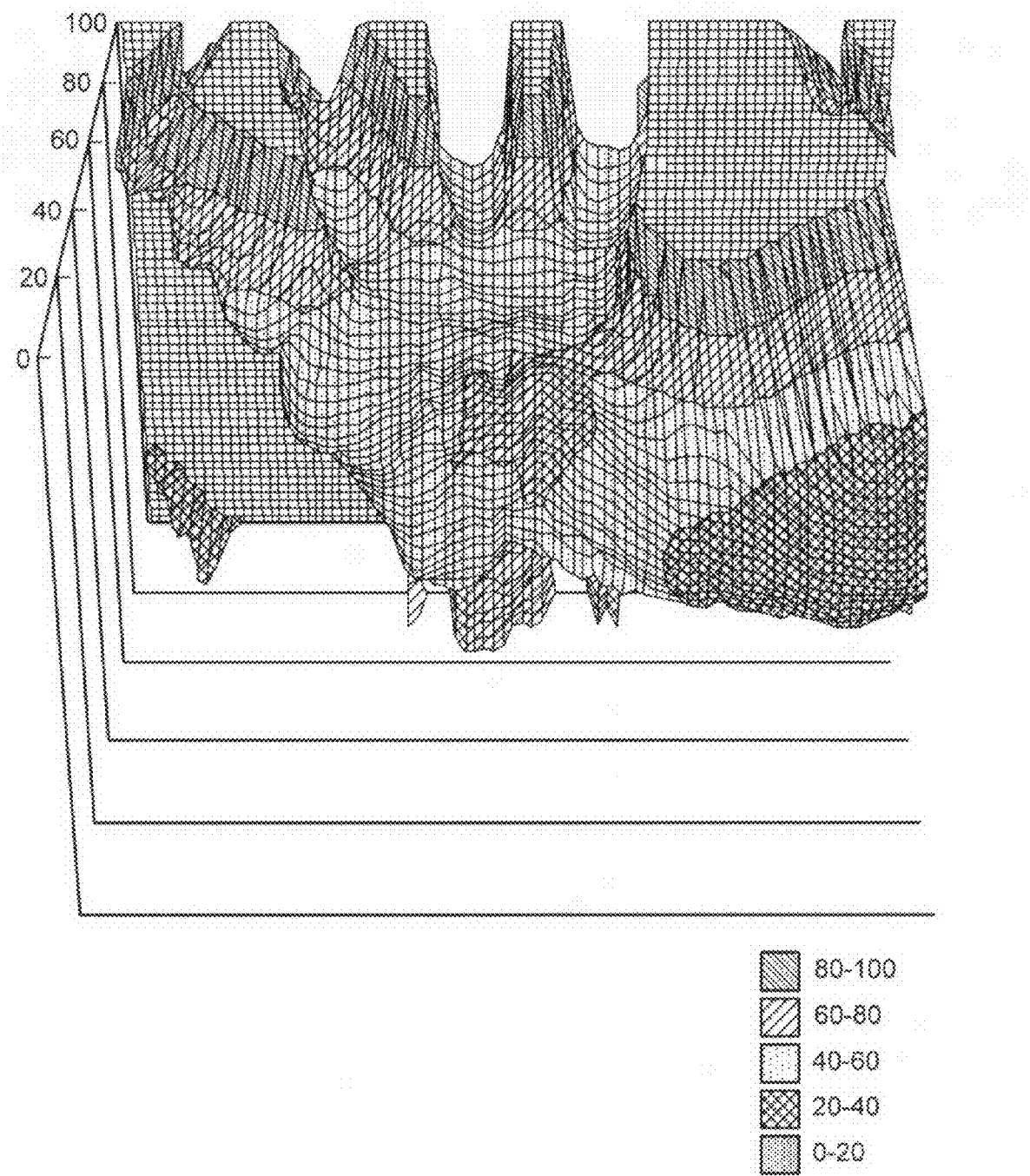
FIG. 7 is a diagram illustrating an example of a distance image that is obtained by plotting the distance data three-dimensionally.

The distance image generating unit 36 generates a distance image that is obtained by converting the value of the distance to the object, which is calculated by the distance estimating unit 34, to an image. A specific example of the above-described example will be provided here. The distance image generating unit 36 generates a distance image, which is obtained by converting the distance data illustrated in FIGS. 6 and 7 to an image, using the data on the distance to the object, which is calculated by the distance estimating unit 34, and the distance image generating unit 36 then outputs the distance image to the distance image display unit 14. In the lookup table represented in FIG. 6, the color for a distance to an object that is proper and the color for a distance to the object that is not proper are displayed in different colors. This urges the user to make adjustments on the object such that the color representing a proper distance can be achieved. FIG. 6 is a diagram illustrating an example of a color lookup table that is color-coded according to the distance data. FIG. 7 is a diagram illustrating an example of a distance image that is obtained by plotting the distance data three-dimensionally.

Processes Performed by Image Capturing Apparatus According to First Embodiment

Figure 8:
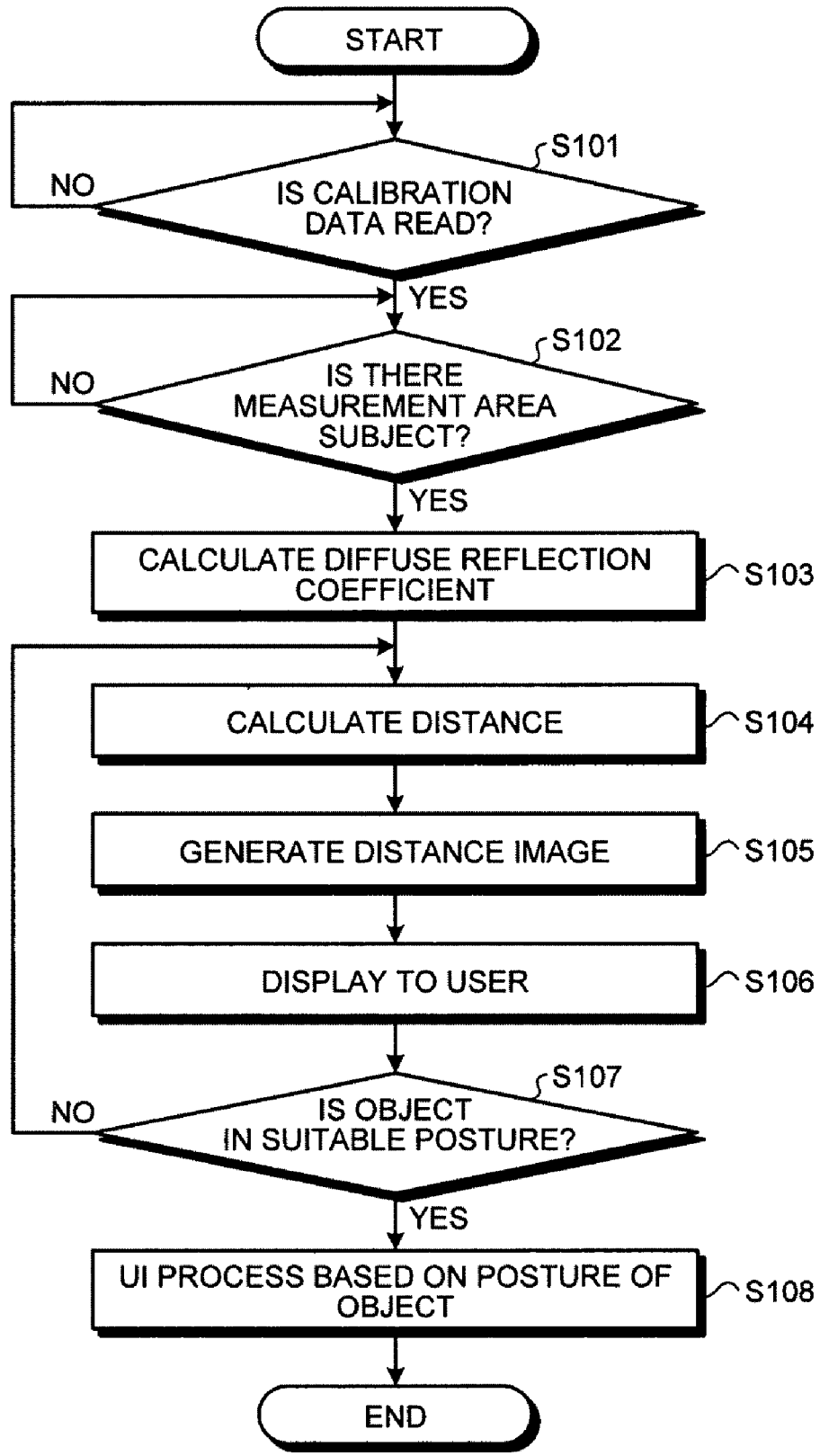
FIG. 8 is a flowchart of processes that are performed by the image capturing apparatus according to the first embodiment.

The processes that are performed by the image capturing apparatus 10 according to the first embodiment will be explained below. FIG. 8 is a flowchart of the processes performed by the image capturing apparatus 10 according to the first embodiment.

As illustrated in FIG. 8, the image capturing apparatus 10 reads a distance "$Z_C$" from the lens of the camera to the calibration plane and a luminance "$E_C$" of the calibration plane, which are stored in the calibration data storage unit 21, (YES at step S101) and determines whether there is an object that is a measurement subject (step S102).

When there is an object that is a measurement subject (YES at step S102), the image capturing apparatus 10 measures a distance "$Z_S$" to one or more arbitrary points on the object using the spot light source 13. The image capturing apparatus 10 then acquires a reflection light intensity that represents the intensity of light, which is reflected from the object, using the near-infrared light source 12 with respect to one or more arbitrary points on the object, on which measurement is performed using the spot light source 13. Thereafter, the image capturing apparatus 10 calculates a diffuse reflection coefficient "$r_F$" or "$r_F/r_C$" of the object using a luminance "$E_S$" that represents the intensity of brightness, which is estimated from the pixel value corresponding to the reflection light intensity, the measured distance "$Z_S$", and the "$Z_C$" and "$E_C$" that are stored in the calibration data storage unit 21 (step S103).

The image capturing apparatus 10 then calculates the distance "$Z_F$" from the lens of the camera to each point on the captured near-infrared image, which covers the object, using the luminance "$E_F$" that is obtained by capturing the near-infrared image of the object, using the near-infrared light source 12; the calculated diffuse reflection coefficient "$r_F$" or "$r_F/r_C$"; the luminance "$E_C$" of the calibration plane; and the distance "$Z_C$" from the lens of the camera to the calibration plane (step S104).

The image capturing apparatus 10 then generates a distance image (see FIGS. 6 and 7) that is obtained by converting the distance data on the calculated distance "$Z_F$" to points on the near-infrared image, which covers the object (step S105). Thereafter, the image capturing apparatus 10 displays the generated distance image on the predetermined display unit (step S106). The image capturing apparatus 10 then determines whether the object is in a suitable posture on the basis of the flatness of the object or variations in the distance data, which is displayed to the user, using the distance data (step S107).

When the object is in a suitable posture, the image capturing apparatus 10 performs various user interface processes on the basis of the object's posture (step S108). If, at step S107, it is determined that the object is not in a suitable posture (NO at step S107), the image capturing apparatus 10 performs the process at step S104 by making an alert and pointing out which of the portions of the object are not suitable using sounds or graphics.

Process Performed by Calibration Unit According to First Embodiment

Figure 9:
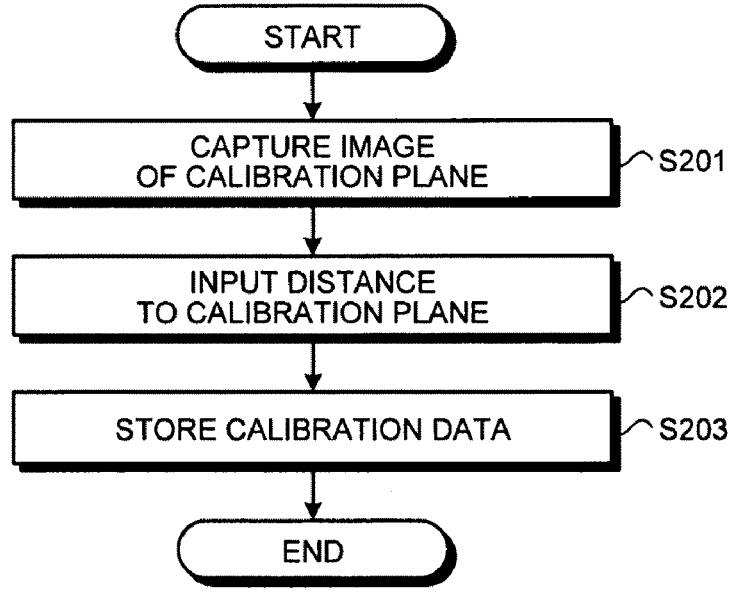
FIG. 9 is a flowchart of processes that are performed by a calibration unit according to the first embodiment.

The processes that are performed by the calibration unit 32 according to the first embodiment will be explained below with reference to FIG. 9. FIG. 9 is a flowchart of the processes that are performed by the calibration unit 32 according to the first embodiment.

As illustrated in FIG. 9, the calibration unit 32 previously captures, using the near-infrared light source 12, a calibration image (calibration plane) that is a calibration image that serves as a reference when the distance to an arbitrary object is calculated (step S201). The calibration unit 32 then inputs, via the predetermined input device, the distance "$Z_C$" (for example, 10 cm) from the lens of the camera to the calibration plane of which an image is captured (such as a keyboard or a touch panel) (step S202).

The calibration unit 32 stores, in the calibration data storage unit 21, the distance "$Z_C$" from the lens of the camera to the calibration plane and the luminance "$E_C$" that is obtained from the calibration plane of which an image is previously captured and that represents the intensity of brightness, which is estimated from the pixel value corresponding to the reflection light intensity representing the intensity of reflected light (step S203).

Figure 10:
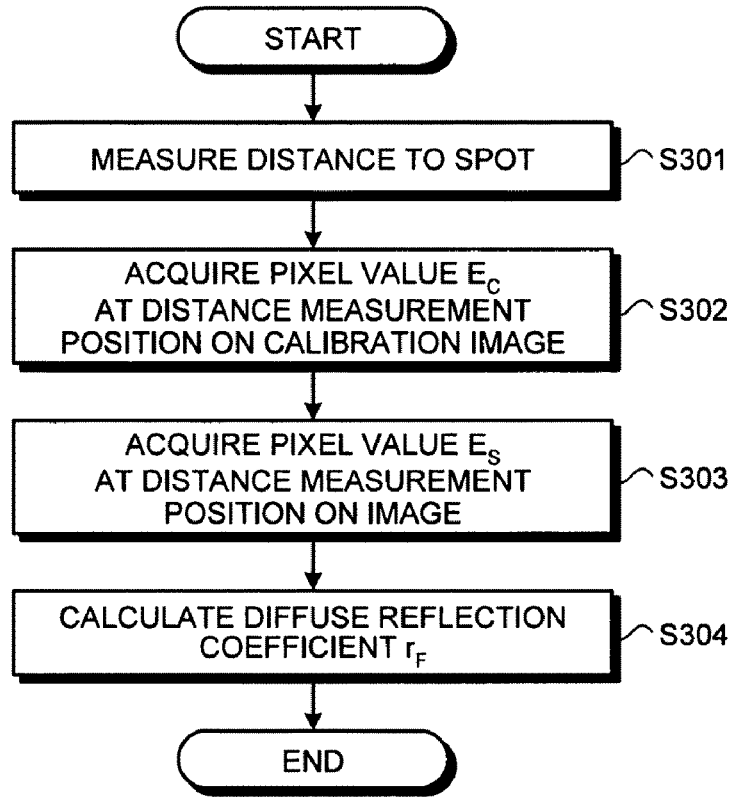
FIG. 10 is a flowchart of processes that are performed by a reflection coefficient estimating unit according to the first embodiment.

Processes Performed by Reflection Coefficient Estimating Unit According to First Embodiment Processes that are performed by the reflection coefficient estimating unit 33 according to the first embodiment will be explained below. FIG. 10 is a flowchart of the processes that are performed by the reflection coefficient estimating unit 33 according to the first embodiment.

As illustrated in FIG. 10, the reflection coefficient estimating unit 33 measures the distance "$Z_S$" to the one or more arbitrary points on the object (measurement subject) using the spot light source 13 (step S301). The reflection coefficient estimating unit 33 acquires the luminance "$E_C$" of the calibration plane, which is stored in the calibration data storage unit 21 (step S302).

Subsequently, the reflection coefficient estimating unit 33 acquires, using the near-infrared light source 12, the reflection light intensity that represents the intensity of light that is reflected from the object, and the reflection coefficient estimating unit 33 acquires a luminance "$E_S$" that represents the intensity of brightness, which is estimated from the pixel value corresponding to the reflection light intensity with respect to one or more arbitrary points on the object on which measurement is performed using the spot light source 13 (step S303).

Thereafter, the reflection coefficient estimating unit 33 calculates the diffuse reflection coefficient "$r_F$" of the object using the acquired "$E_C$" and "$E_S$", the measured distance "$Z_S$" to the object, and the distance "$Z_C$" to the calibration plane, which is stored in the calibration data storage unit 21 (step S304).

Processes Performed by Distance Estimating Unit According to First Embodiment

Figure 11:
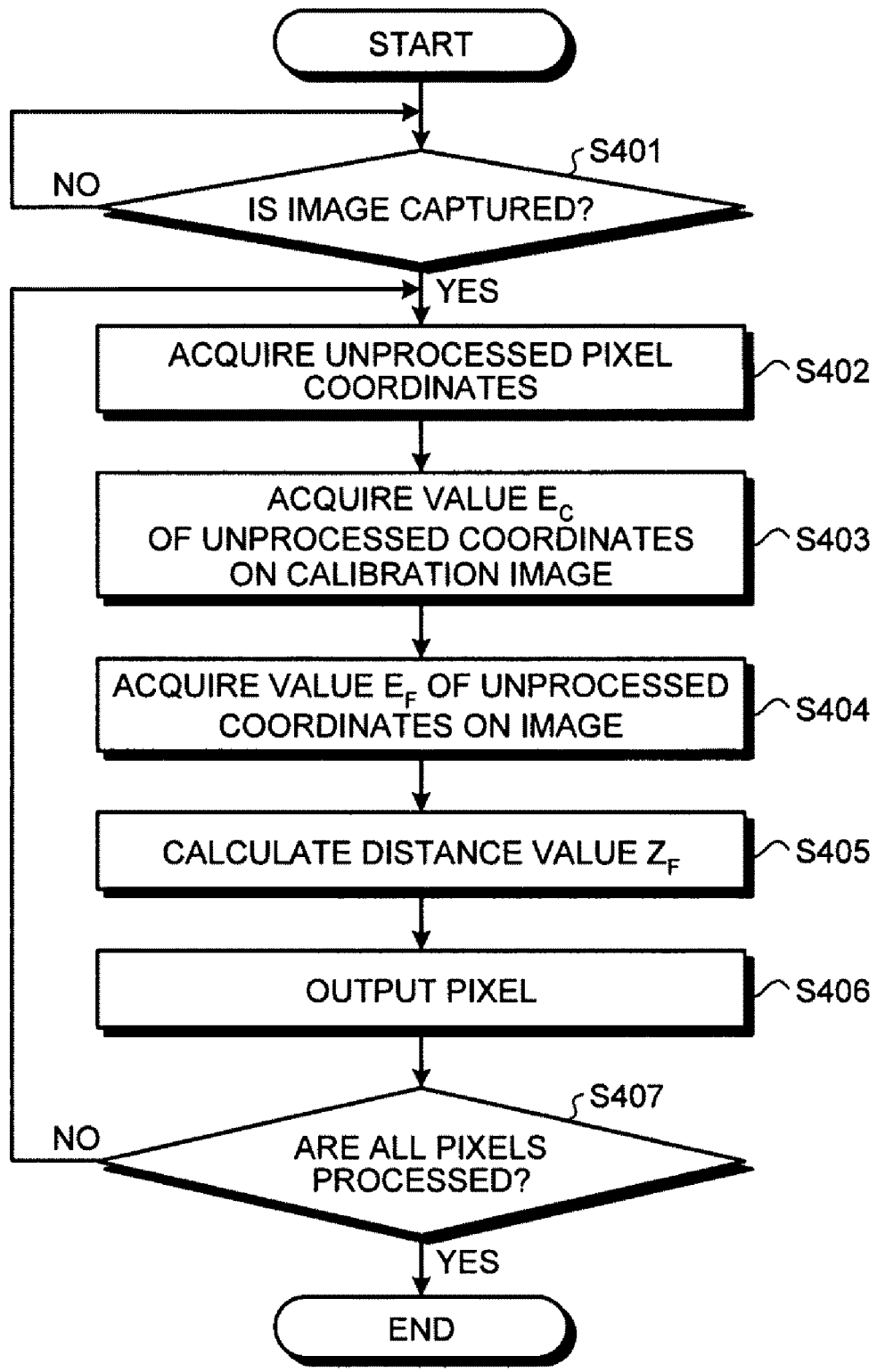
FIG. 11 is a flowchart of processes that are performed by a distance estimating unit according to the first embodiment.

Processes that are performed by the distance estimating unit 34 according to the first embodiment will be explained below. FIG. 11 is a flowchart of the processes that are performed by the distance estimating unit 34 according to the first embodiment.

As illustrated in FIG. 11, when the near-infrared image of the object is captured using the near-infrared light source 12 (YES at step S401), the distance estimating unit 34 acquires the coordinates of an unprocessed pixel, the distance to which from the lens of the camera has not been calculated, in the near-infrared image (step S402).

The distance estimating unit 34 acquires the luminance "$E_C$" of the calibration plane, which is stored in the calibration data storage unit 21 (step S403). The distance estimating unit 34 acquires the luminance "$E_F$" that is obtained from the captured near-infrared image and that represents the intensity of brightness, which is estimated from the pixel value corresponding to the reflection light intensity (step S404).

The distance estimating unit 34 then calculates the distance "$Z_F$" from the lens of the camera to the coordinates of the pixel that are acquired in the captured near-infrared image, which covers the object, using the acquired "$E_C$" and "$E_F$", the distance "$Z_C$" to the calibration plane, and the diffuse reflection coefficient "$r_F$" of the object, which is calculated by the reflection coefficient estimating unit 33 (step S405).

The distance estimating unit 34 outputs the calculated distance "$Z_F$" to the coordinates of the pixel to the posture instructing unit 35 and the distance image generating unit 36 (step S406). The distance estimating unit 34 then determines whether the process for a distance "$Z_F$" is performed with respect to all pixels (step S407). When the process for a distance "$Z_F$" is performed with respect to all pixels, the process is completed (YES at step S407). When the process for a distance "$Z_F$" is performed with respect to only some of the pixels (NO at step S407), the process at step S402 is performed. The pixels, a distance "$Z_F$" to which is calculated by the distance estimating unit 34, are acquired and processed not one by one but collectively.

Effects of First Embodiment

As described above, the image capturing apparatus 10 measures the distance from the lens of the camera to one or more arbitrary points on an object. The image capturing apparatus 10 calculates the diffuse reflection coefficient of the object using the distance from the lens of the camera to a calibration image; the measured distance to one or more arbitrary points on the object; and the luminance that is obtained by applying diffuse light to each of one or more arbitrary points and that represents the intensity of brightness, which is estimated from the pixel value corresponding to the reflection light intensity representing the intensity of light reflected from the object. The image capturing apparatus 10 calculates the distance from the lens of the camera to the object using the distance from the lens of the camera to the calibration image, the luminance of the calibration image, the calculated diffuse reflection coefficient, and the luminance of the object. Thus, even if an image of an object for which the diffuse reflection coefficient is unknown is captured, an accurate distance can be measured.

For example, the image capturing apparatus 10 previously captures a calibration image that is a calibration image that serves as a reference when the distance to an arbitrary object is calculated. The image capturing apparatus 10 then stores the luminance "$E_C$" of the captured calibration image and the distance "$Z_C$" to the calibration image in the calibration data storage unit 21. The image capturing apparatus 10 then measures the distance "$Z_S$" to one or more arbitrary points on the object using the spot light source. Thereafter, the image capturing apparatus 10 acquires the reflection light intensity that represents the intensity of light, which is reflected from the object, using the near-infrared light source. The image capturing apparatus 10 then calculates the diffuse reflection coefficient "$r_F$" of the object using the luminance "$E_S$" that represents the intensity of brightness, which is estimated from the pixel value corresponding to the acquired reflection light intensity, the measured distance "$Z_S$", the distance "$Z_C$" to the calibration plane, and the luminance "$E_C$" of the calibration plane "$E_C$". The image capturing apparatus 10 then calculates the distance "$Z_F$" from the lens of the camera to each point on the captured near-infrared image, which covers the object, using the luminance "$E_F$" with respect to each point on the object, the calculated diffuse reflection coefficient "$r_F$", the luminance "$E_C$" of the calibration plane, and the distance "$Z_C$". Accordingly, even when an image of an object for which the diffuse reflection coefficient is unknown is captured, an accurate distance can be measured. In other words, the image capturing apparatus 10 can calculate the distance to all points (all pixels) on the object using the information on the luminance or distance from the calibration image, which is previously captured, and the distance to one or more arbitrary points on the object that is a measurement subject. Accordingly, even when an image of an object for which the diffuse reflection coefficient is unknown, the image capturing apparatus 10 can accurately measure the distance.

[b] Second Embodiment

An embodiment of the present invention has been explained above. The present invention may perform in various different modes in addition to the above-described embodiment. The different embodiments are separated into (1) a system configuration and (2) a program and will be explained below.

(1) System Configuration

The process procedures, the control procedures, the specific names, and information containing various types of data and parameters (for example, the specific names, such as the reflection coefficient estimating unit 33 and the distance estimating unit 34), which are illustrated in the specification or the drawings, may be arbitrarily changed unless otherwise stated.

The components of each device illustrated in the drawings are functional concepts and are not necessarily required to be physically configured as illustrated in the drawings. In other words, the specific modes of separation or integration of devices are not limited to those illustrated in the drawings. For example, the devices may be configured in a way that they are entirely or partially separated or integrated functionally or physically on an arbitrary unit basis in accordance with various loads or how they are used, e.g., measurement of the distance using the spot light source 13, which is performed by the calibration unit 32 and the reflection coefficient estimating unit 33, may be separated into a "spot distance measuring unit". Furthermore, each process function performed by each device may be entirely or arbitrarily partly implemented by a CPU or programs that are analyzed and executed by the CPU, or each process function performed by each device may be implemented as wired logic hardware.

(2) Program

Figure 12:
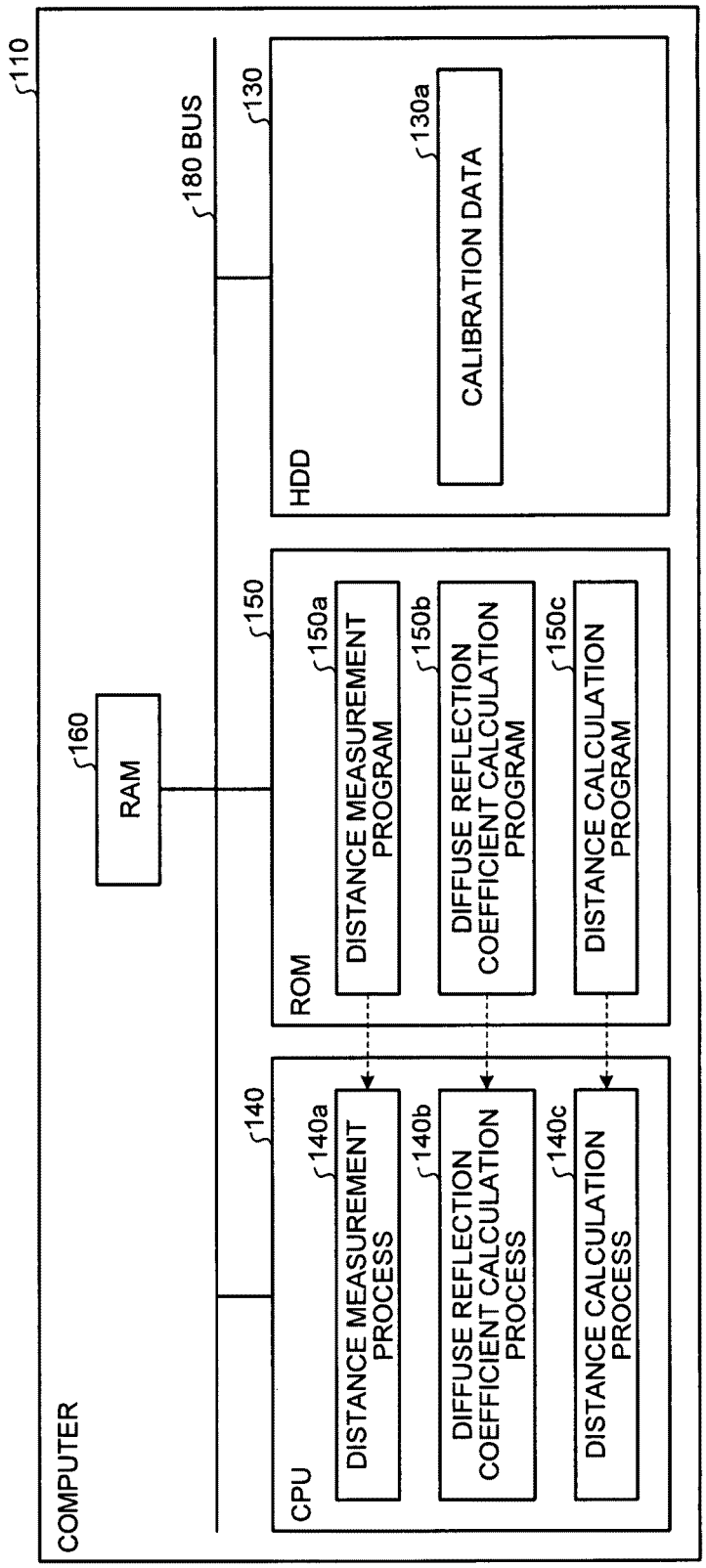
FIG. 12 is a diagram of a computer that executes an image capturing program.

The image capturing apparatus that is explained in the embodiment can be realized by executing prepared programs on a computer, such as a personal computer or a work station. An example of a computer that executes an image capturing program that implements similar functions as those of the image capturing apparatus illustrate in the embodiment will be explained below with reference to FIG. 12. FIG. 12 is a diagram of a computer that executes the image capturing program.

As illustrated in FIG. 12, a computer 110 that serves as the image capturing apparatus is configured by connecting an HDD 130, a CPU 140, a ROM 150, and a RAM 160 via a bus 180.

The ROM 150 previously stores the image capturing program that implements similar functions as those of the image capturing apparatus 10 illustrated in the first embodiment, i.e., stores, as illustrated in FIG. 12, a distance measurement program 150a, a diffuse reflection coefficient calculation program 150b, and a distance calculation program 150c. The programs 150a to 150c may be integrated or separated like the components of the image capturing apparatus 10 illustrated in FIG. 2.

The CPU 140 reads the programs 150a to 150c from the ROM 150 and executes the programs 150a to 150c, so that, as illustrated in FIG. 12, the programs 150a to 150c function as a distance measurement process 140a, a diffuse reflection coefficient calculation process 140b, and a distance calculation process 140c, respectively. The processes 140a to 140c correspond respectively to the calibration unit 32, the reflection coefficient estimating unit 33, and the distance estimating unit 34, which are illustrated in FIG. 2.

The CPU 140 executes the image capturing program using a calibration data 130a, which is stored in the HDD 130.

The programs 150a to 150c are not necessarily required to be stored originally in the ROM 150. For example, programs 150a to 150c may be stored in "a portable physical medium" that is inserted into the computer 110, such as a flexible disk (FD), a CD-ROM, a DVD disk, a magneto-optical disk, and an IC card, or "a fixed physical medium" that is provided in or outside the computer, such as an HDD, or "another computer (or a server)" that is connected to the computer 110 via, for example, public lines, the Internet, a LAN, or a WAN such that the computer 110 can read the programs 150a to 150c from a medium or another computer and then execute them.

According to an aspect of the image processing apparatus that is disclosed in this application, when measuring the distance from the lens of a camera to a homogeneous object, the distance to one or more points on an image of the object is measured and the distance to each point (all points) on the object is calculated using one or more of the points on which measurement is performed. This leads to an effect that, when the image of an object for which the diffuse reflection coefficient is unknown is captured, the distance can be measured accurately.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An image capturing apparatus comprising:
    a distance measuring unit that measures a distance from a lens of a monocular camera for capturing an image of an object to one or more arbitrary points on the object;
    a diffuse reflection coefficient calculating unit that calculates a diffuse reflection coefficient of the object using the distance from the lens of the camera to a calibration image, a luminance of the calibration image, the distance to one or more arbitrary points on the object, which is measured by the distance measuring unit, and a luminance that is obtained by applying diffuse light to each of the one or more arbitrary points and that represents an intensity of brightness, which is estimated from a pixel value corresponding to a reflection light intensity representing an intensity of light reflected from the object, the calibration image being previously captured and serving as a reference when a distance to the object is calculated; and
    a distance calculating unit that calculates a distance from the lens of the camera to the object based on the distance from the lens of the camera to the calibration image, the luminance of the calibration image, the diffuse reflection coefficient of the object, which is calculated by the diffuse reflection coefficient calculating unit, and the luminance of the object.

2. The image capturing apparatus according to claim 1, further comprising a distance image generating unit that generates a distance image that is obtained by converting the value of the distance to the object, which is calculated by the distance calculating unit, to an image.

3. The image capturing apparatus according to claim 1, further comprising a distance image alert outputting unit that converts the value of the distance to the object, which is calculated by the distance calculating unit, to an image and outputs, according to variations in distance in a distance image of the object, an alert when there is a portion the distance to which is extremely different.

4. An image capturing method comprising:
    measuring a distance from a lens of a monocular camera for capturing an image of an object to one or more arbitrary points on the object;
    calculating a diffuse reflection coefficient of the object using the distance from the lens of the camera to a calibration image, a luminance of the calibration image, the distance to one or more arbitrary points on the object, and a luminance that is obtained by applying diffuse light to each of the one or more arbitrary points and that represents an intensity of brightness, which is estimated from a pixel value corresponding to a reflection light intensity representing an intensity of light reflected from the object, the calibration image being previously captured and serving as a reference when a distance to the object is calculated; and
    calculating a distance from the lens of the camera to the object based on the distance from the lens of the camera to the calibration image, the luminance of the calibration image, the diffuse reflection coefficient of the object, and the luminance of the object.

5. A non-transitory computer readable storage medium having stored therein an image capturing program causing a computer to execute a process comprising:
    measuring a distance from a lens of a monocular camera for capturing an image of an object to one or more arbitrary points on the object;
    calculating a diffuse reflection coefficient of the object using the distance from the lens of the camera to a calibration image, a luminance of the calibration image, the distance to one or more arbitrary points on the object, and a luminance that is obtained by applying diffuse light to each of the one or more arbitrary points and that represents an intensity of brightness, which is estimated from a pixel value corresponding to a reflection light intensity representing an intensity of light reflected from the object, the calibration image being previously captured and serving as a reference when a distance to the object is calculated; and
    calculating a distance from the lens of the camera to the object based on the distance from the lens of the camera to the calibration image, the luminance of the calibration image, the diffuse reflection coefficient of the object, and the luminance of the object.

* * * * *